(12) United States Patent
Rahm

(10) Patent No.: US 7,077,255 B2
(45) Date of Patent: Jul. 18, 2006

(54) PNEUMATIC POWER NUT RUNNER WITH AUTOMATIC SHUT-OFF

(75) Inventor: Erik Roland Rahm, Upplands Väsby (SE)

(73) Assignee: Atlas Copco Tools AB, Tokyo (JP)

( * ) Notice: Subject to any disclaimer, the term of this patent is extended or adjusted under 35 U.S.C. 154(b) by 140 days.

(21) Appl. No.: 10/505,199

(22) PCT Filed: Feb. 19, 2003

(86) PCT No.: PCT/SE03/00267

§ 371 (c)(1),
(2), (4) Date: Aug. 19, 2004

(87) PCT Pub. No.: WO03/092960

PCT Pub. Date: Nov. 13, 2003

(65) Prior Publication Data

US 2005/0155833 A1    Jul. 21, 2005

(30) Foreign Application Priority Data

Feb. 22, 2002    (SE) .................................... 0200516

(51) Int. Cl.
*B25B 23/45* (2006.01)
*B23P 19/06* (2006.01)

(52) U.S. Cl. ................. 192/48.7; 192/56.54; 192/55.1; 173/178

(58) Field of Classification Search ............... 192/48.7, 192/55.1, 56.54; 81/474; 173/178
See application file for complete search history.

(56) References Cited

U.S. PATENT DOCUMENTS

| | | | | |
|---|---|---|---|---|
| 2,881,888 A | * | 4/1959 | Amtsberg | 192/56.53 |
| 3,612,236 A | | 10/1971 | Fernstrom | |
| 4,071,092 A | * | 1/1978 | Wallace | 173/178 |
| 5,060,772 A | * | 10/1991 | Anders et al. | 173/178 |
| 5,129,465 A | * | 7/1992 | Rahm | 173/178 |
| 5,201,374 A | * | 4/1993 | Rahm | 173/178 |
| 5,558,168 A | * | 9/1996 | Rahm | 173/178 |
| 5,775,186 A | * | 7/1998 | Rahm | 173/178 |
| 6,662,882 B1 | * | 12/2003 | Hansson | 173/178 |

\* cited by examiner

*Primary Examiner*—Saul Rodriguez
(74) *Attorney, Agent, or Firm*—Frishauf, Holtz, Goodman & Chick, P.C.

(57) ABSTRACT

A pneumatic power nut runner with a rotation motor which is connected to a drive train including a torque responsive release clutch (10) and a disengageable torque non-responsive clutch (11), a pressure air inlet valve (12), and an activation mechanism (49, 50) for automatic power shut-off at the attainment of a desired maximum torque level. The activation mechanism (49, 50) comprises a transversely displaceable latch element (49) provided with a blind bore (54) for permitting closure of the inlet valve (12) and a depression (55) for allowing engagement of the torque non-responsive clutch (11), wherein a transverse displacement of the latch element (49) at the attainment of the desired torque level results in a freeing of the inlet valve (12) for displacement toward closed position and a forcing of the torque non-responsive clutch (11) out of engagement.

8 Claims, 2 Drawing Sheets

FIG 1
FIG 2
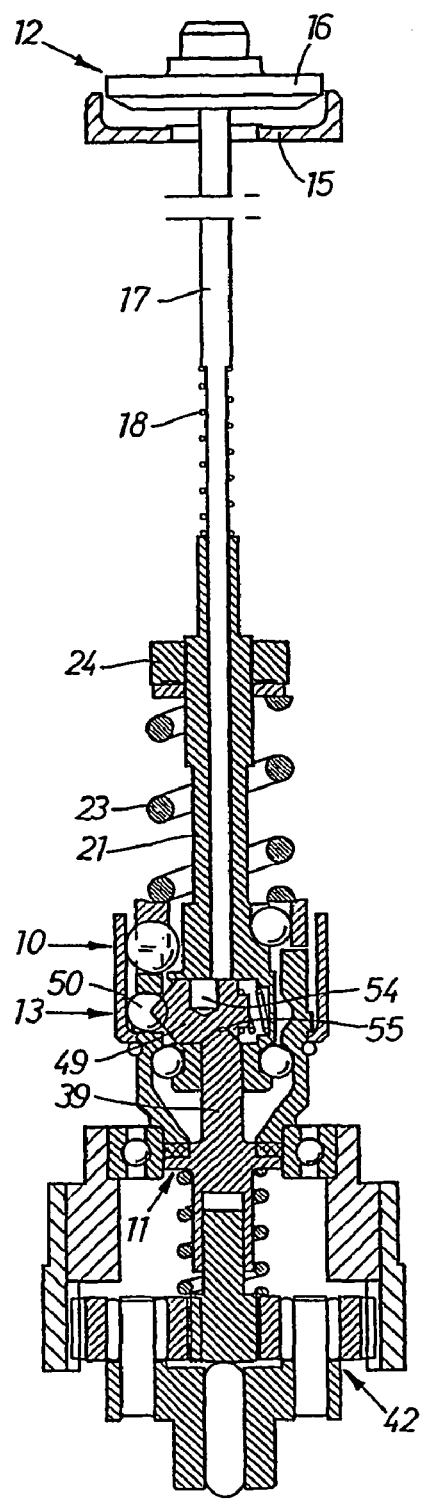
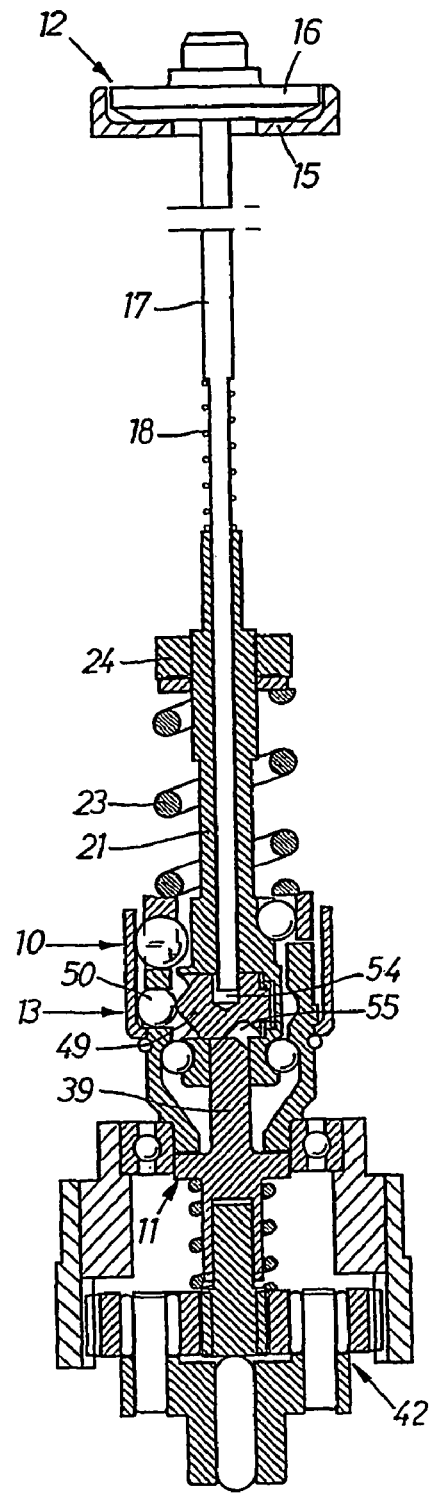

PNEUMATIC POWER NUT RUNNER WITH AUTOMATIC SHUT-OFF

This application is a U.S. National Phase Application under 35 USC 371 of International Application PCT/SE03/00267 filed Feb. 19, 2003.

The invention relates to a type of power nut runner having an automatic power shut-off feature and comprising a rotation motor connected to an output shaft via a drive train which includes a torque responsive release clutch and a disengageable torque non-responsive clutch, a pressure air inlet valve for controlling the pressure air supply to the motor, and a valve shifting mechanism including a transversely displaceable latch element supported on one of the release clutch halves and arranged to provide for a shifting of the inlet valve from an open position to a closed position at release of the release clutch.

In a prior art nut runner of the above type, shown in U.S. Pat. No. 3,612,236, a transversely displaceable latch element supports the inlet valve in open position which means a positive locking against unintentional premature power shut-off. The inlet valve is shifted, however, to closed position by a spring force as well as by a pressure drop related force generated at part-closure of the valve. In this known nut runner the displaceable clutch half of the torque non-responsive clutch forms a part of the valve shifting mechanism and is arranged to move conjointly with the inlet valve, which means that the action of both the torque non-responsive clutch and the inlet valve are dependent on spring and pressure drop forces. This means that it is crucial for an accurate valve shut-off and clutch disconnection action that the tolerances of the clutch parts and the spring force are within very tight limits. This is a serious drawback of this nut runner, because it is difficult and expensive to ensure such accurate tolerances and spring force characteristics.

Another previously known but slightly differently designed power nut runner suffers from a somewhat uncertain shut-off function, because in this case the inlet valve is maintained in its open position by spring force only, which means that the valve function is sensitive to external dynamic forces that might be exerted on the nut runner. An unintentional blow or impact on the nut runner during operation could be enough to move the inlet valve a certain distance in the closing direction against the spring force such that an increased pressure drop across the valve will take over and complete closing of the valve. This nut runner, though, do have a cam means for positively shifting the torque non-responsive clutch to disengaged position.

The main object of the invention is provide an improved power nut runner of the initially described type, wherein all the drawbacks of the above mentioned prior art nut runners are overcome, namely the risk of unintentional premature power shut-off and disconnection of the torque non-responsive clutch. This is accomplished by providing a positive mechanical locking of the inlet valve before the release of the torque responsive release clutch, as well as a positive mechanical disengagement of the torque non-responsive clutch at the release of the release clutch.

Another object of the invention is to provide a power nut runner of the above type having a simple and compact design.

A preferred embodiment of the invention is below described in detail with reference to the accompanying drawing.

On the drawings

FIG. 1 shows schematically a cross section through a clutch and shut-off mechanism for a pneumatic power nut runner according to the invention and illustrates the pre-release/shut-off condition of the device.

FIG. 2 shows the same cross section as in FIG. 1, but illustrates the clutch release and power shut-off point of the device.

Figure 3:
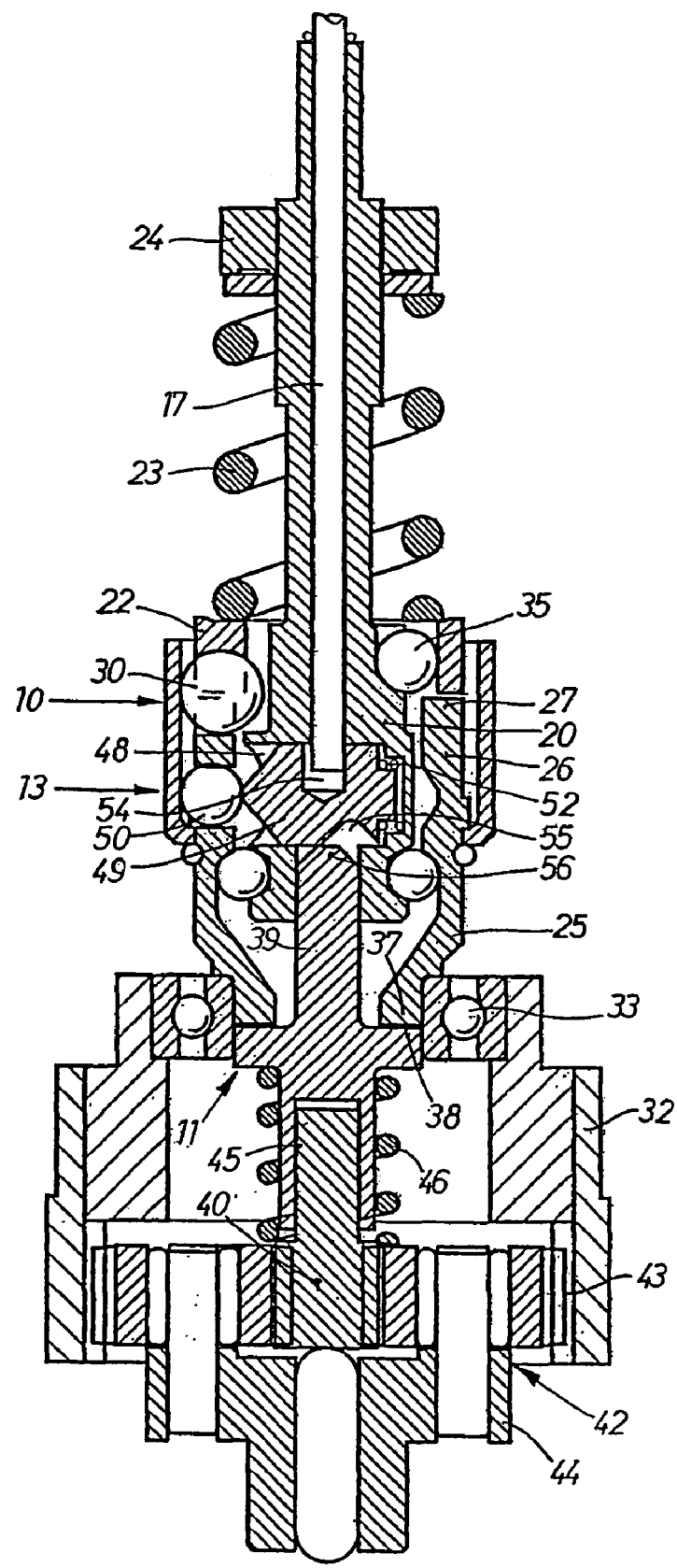
FIG. 3 shows on a larger scale a part of the device as illustrated in FIG. 2.

The clutch and power shut-off mechanism shown in the drawing figures is intended to form a part of a pneumatic power nut runner of a well known type having a rotation motor (not shown) connected to a drive train with a torque responsive release clutch 10 and a disengageable torque non-responsive clutch 11, and an automatic power shut-off device including a pressure air inlet valve 12 and an activating mechanism 13. The inlet valve 12 is intended to control the pressure air supply to the motor and comprises a seat 15, a valve element 16 and an activation rod 17. In a conventional way, the inlet valve 12 is located at the rear end of the motor, and the activation rod 17 extends axially through the motor for co-operation with the activation mechanism 13. A reset spring 18 is arranged to bias the activation rod 17 and the valve element 16 toward the open position of the inlet valve 12. In a conventional way the pressure air supply to the inlet valve is controlled by a manually operated throttle valve (not shown).

The torque responsive release clutch 11 comprises a driving half 20 with drive spindle 21, an axially displaceable thrust element 22, a spring 23 acting on the thrust element 22, and an adjustable spring support 24. The clutch 11 also includes a driven half 25 with a sleeve shaped member 26 formed with axially extending cam surfaces 27 for co-operation with a number of torque transferring balls 30. The balls 30 are urged into a camming engagement with the cam surfaces 27 by the thrust element 22 and the spring 23. At its forward end the sleeve shaped member 26 is radially supported relative to a stationary ring gear structure 32 via a bearing 33. A ball spline 35 is arranged to rotationally lock the thrust element 22 to the drive spindle 21.

The torque non-responsive clutch 11 is formed by axially directed straight teeth 37 on the sleeve member 26 and matching teeth 38 on an axially displaceable clutch spindle 39. The latter is rotationally locked relative to a sun gear 40 of a planetary reduction gearing 42 including a ring gear 43 located on the ring gear structure 32. The rotational locking of the clutch spindle 39 is preferably obtained by a hexagonal coupling 45. A planetary wheel carrier 44 is connected to a further reduction gearing or directly to an output shaft. A spring 46 is arranged to bias the clutch spindle teeth 38 into engagement with the sleeve member teeth 37.

Moreover, the driven clutch half 25 of the release clutch 10 is formed with a transverse guide way 48 for displaceably guiding a latch element 49, and an activation ball 50 supported in an aperture in the sleeve member 26 is arranged to co-operate with the latch element 49. A spring 52 urges the latch element 49 into engagement with the activation ball 50.

The latch element 49 is provided on its one side with a blind bore 54 and on its opposite side with a conical depression 55. The conical shape of the depression 55 provides an inclined cam surface for accomplishing disengagement of the torque non-responsive clutch 11. The blind bore 54 and the depression 55 are not located co-axially relative to each other.

In operation of the power nut runner, motive pressure air is supplied to the motor via the throttle valve and the inlet valve 12, and the inlet valve 12 is maintained in open position by the activation rod 17 which is endwise supported on the latch element 49. The motor is delivering torque to the drive spindle 21 which via the thrust element 22, the balls 30 and the cam surfaces 27 is connected to the driven clutch half 25. The torque is further transferred to the reduction gearing 42 via the clutch spindle 39 of torque non-responsive clutch 11. The clutch spindle 39 has a pointed rear end 56 which is received in the depression 55 such that the clutch spindle 39 occupies its rear engaged position, i.e. the spindle teeth 38 engage the sleeve member teeth 37. Torque is now transferred via the clutches 10 and 11 to the sun wheel 40 of the reduction gearing 42 and further to the output shaft of the nut runner via the planet wheel carrier 44.

As long as the transferred torque does not reach the desired maximum level the activation mechanism 13 will remain in its inactive position. See FIG. 1. However, when the predetermined maximum torque level is reached a relative rotational movement between the driving and driven clutch halves occurs, which means that the cam surfaces 27 start urging the balls 30 and the thrust element 22 rearwards against the action of the spring 23. As the balls 30 have reached the top crests of the cam surfaces 27 and the torque transfer between the clutch halves has ceased, the activation ball 50 engages the latch element 49 and displaces the latter in a radial direction. Thereby, the blind bore 54 comes into alignment with the activation rod 17 permitting the latter to be displaced forwards by the pressure air force acting on the valve element 16 and penetrate into the blind bore 54. Now, the valve element 16 seats on the valve seat 15 and stops further pressure air supply to the motor.

The radial displacement of the latch element 49 also results in the pointed end 56 of the clutch spindle 21 being cammed out of the depression 55 resulting in a forward displacement of the clutch spindle 21 against the action of spring 46. Thereat, the teeth 38 are retracted from their engagement with the teeth 37 on the sleeve member 26 and the connection between the driven clutch half 25 and the clutch spindle 21 is broken. See FIGS. 2 and 3.

Accordingly, the radial displacement of the latch element 49 accomplishes both a closure of the inlet valve 12 and a disengagement of the torque non-responsive clutch 11, which means that not only the motor power is discontinued but the connection between the motor and the release clutch 10 on one hand and the output shaft is mechanically broken. This is of importance in order to ensure an instantaneous and complete cessation of torque transfer to the output shaft and to the threaded joint being tightened.

By the above described device it is ensured that the inlet valve 12 cannot be unintentionally and prematurely closed due to external forces on the nut runner, and at the same time it is ensured that the torque non-responsive clutch 11 is correctly and positively disengaged without any dependency on pressure air forces.

As the pressure air supply to the motor has been shut off by the inlet valve 12 and the drive connection between the motor and the output shaft of the nut runner has been broken by the torque non-responsive clutch 11 the tightening operation is completed. Before the operator has closed the throttle valve, the air pressure still acting on the valve element 16 keeps the inlet valve 12 closed, and the activation rod 17 is kept in engagement with the blind bore 54 of the latch element 49. This means that the latch element 49 is locked in its displaced position, thereby maintaining the clutch spindle 39 in disengaged position.

When the operator finally closes the throttle valve the pressure force acting on the inlet valve element 16 is discontinued and the spring 18 will force the activation rod 17 and the valve element 16 rearwardly to reopen the inlet valve 12. As a result of this, the activation rod 17 unlocks the latch element 49 for a reset movement, wherein the depression 55 comes into alignment with the pointed end 56 of the clutch spindle 39. Now, the pointed end 56 is able to re-enter the depression 55, and the clutch spindle 39 is displaced rearwards to allow the clutch teeth 38 re-age engage the teeth 37 on the sleeve member 26. The nut runner is now reset for another operation cycle.

The invention claimed is:

1. A pneumatic power nut runner comprising:
a rotation motor;
a drive train connecting the motor to an output shaft including a torque responsive release clutch and a disengageable torque non-responsive clutch;
wherein the release clutch comprises a driving clutch half and a driven clutch half;
wherein the torque non-responsive clutch comprises an axially immovable clutch half and an axially displaceable clutch half, and an activating mechanism including a latch element which is movably supported on either one of said driving and driven release clutch halves for displacement in a direction transverse to the rotation axis of the clutch upon relative release movement between the driving and the driven release clutch halves;
wherein a first cam means is arranged between one of said driving and driven release clutch halves and the latch element for accomplishing said transverse displacement of the latch element; and
wherein a second cam means is arranged between the latch element and the axially displaceable clutch half of the torque non-responsive clutch for accomplishing disengagement of the torque non-responsive clutch at release of the release clutch and a consequent transverse displacement of the latch element.

2. The power nut runner according to claim 1, wherein the second cam means comprises an inclined surface on the latch element and a contact portion on the axially displaceable clutch half of the torque non-responsive clutch.

3. The power nut runner according to claim 1, wherein a spring is arranged to exert a bias force on said axially displaceable clutch half of the torque non-responsive clutch in a direction towards the latch element, whereby both of said first cam means and said second cam means are maintained in co-operative engagement.

4. The power nut runner according to claim 2, wherein a spring is arranged to exert a bias force on said axially displaceable clutch half of the torque non-responsive clutch in a direction towards the latch element, whereby both of said first cam means and said second cam means are maintained in co-operative engagement.

5. The power nut runner according to claim 1, wherein the driven clutch half of the torque responsive release clutch is formed integral with said axially immovable clutch half of the torque non-responsive clutch.

6. The power nut runner according to claim 2, wherein the driven clutch half of the torque responsive release clutch is formed integral with said axially immovable clutch half of the torque non-responsive clutch.

7. The power nut runner according to claim 3, wherein the driven clutch half of the torque responsive release clutch is formed integral with said axially immovable clutch half of the torque non-responsive clutch.

8. The power nut runner according to claim 4, wherein the driven clutch half of the torque responsive release clutch is formed integral with said axially immovable clutch half of the torque non-responsive clutch.

* * * * *